United States Patent [19]

Carlton et al.

[11] 4,218,759

[45] Aug. 19, 1980

[54] SYNC IN-SYNC OUT CALIBRATION FOR CABLE LENGTH DELAYS

[75] Inventors: James E. Carlton; Werner J. Schaeuble, both of San Jose, Calif.

[73] Assignee: International Business Machines Corporation, Armonk, N.Y.

[21] Appl. No.: 921,150

[22] Filed: Jun. 30, 1978

[51] Int. Cl.² .............................................. G06F 3/00
[52] U.S. Cl. ................................................... 364/900
[58] Field of Search ............ 235/92 CC; 179/15.55 T, 179/16 F; 340/347 CC; 364/200 MS File, 900 MS File

[56] References Cited

U.S. PATENT DOCUMENTS

| | | | |
|---|---|---|---|
| 3,643,220 | 2/1972 | Katagi | 364/900 |
| 3,725,866 | 4/1973 | Oldfield, Jr. et al. | 364/200 |
| 3,774,157 | 11/1973 | Tsui | 364/200 |
| 3,829,843 | 8/1974 | Cichetti, Jr. et al. | 364/900 |
| 3,919,695 | 11/1975 | Gooding | 364/200 |
| 4,034,294 | 7/1977 | Dalley | 340/347 CC |
| 4,063,308 | 12/1977 | Collins et al. | 364/200 |

Primary Examiner—Leo H. Boudreau
Attorney, Agent, or Firm—Richard E. Cummins

[57] ABSTRACT

A system for controlling the issuance of a "Sync In" signal by a disk file controller to a control unit to request a byte of data to arrive at the controller at the same predetermined time regardless of the propagation delay of the cables interconnecting the two units. The system includes a circuit arrangement for measuring the actual propagation delay of the interface cable by issuing a "Sync In" signal at a predetermined time and detecting when the return "Sync Out" signal is received. The measured time is converted to a "Sync In" lead time in terms of bits and bytes. This value is stored and subsequently controls circuitry for issuing the "Sync In" pulse at a bit time which provides the exact lead time necessary for the "Sync Out" signal to arrive at the predetermined bit and byte time so that the data byte will be encoded and recorded at the predefined location on the moving magnetic disk. The system further includes circuitry for detecting the occurrence of numerous types of errors which may occur between "Sync In" and "Sync Out" signals.

12 Claims, 11 Drawing Figures

SYNC IN-SYNC OUT CALIBRATION FOR CABLE LENGTH DELAYS

DESCRIPTION

1. Technical Field

This invention relates in general to systems for controlling the transfer of data between two units of a data processing system which are interconnected by cables whose length may vary in different installations and wherein the difference in signal propagation time between pairs of units interconnected with different cable lengths becomes significant in controlling the transfer of data. The invention relates more specifically to the control of the transfer of data to a disk file so as to provide a minimum of data buffering hardware at the disk file and permit accurate checking of the data transfer hardware.

2. Background Art

Various arrangements have been disclosed in the prior art to control the transfer of information between units of the data processing system. Since data is generally transferred between these units on a serial by byte basis, the interface cabling generally includes either one bidirectional data bus or two unidirectional data buses where information is to be transferred in both directions between the units. These buses generally extend between the output of a register in one unit and the input of a register in the other unit. The output of the sending register is usually gated in response to a suitable control signal which forms one of the interface lines from the receiving unit to the sending unit. The function of this control signal can be characterized as notifying the sending unit that the receiving unit is in a position to accept another character of data. A similar control line extends from the sending unit to the receiving unit to indicate to the receiving unit that a character has been sent.

Where the receiving unit is a magnetic storage device such as a disk file, the problem of initiating the transfer of data from the sending unit involves timing considerations which can be affected by the propagation delays caused by interface cables of different lengths. When data is transferred to a disk file it must be stored at some predetermined address. This address is usually specified at the track level and a location along the track relation to some predetermined reference point generally referred to as index. The data to be recorded must be supplied to the magnetic transducer at a time when the addressed portion of the record appears under the magnetic transducer. In order to insure that the first character of the data to be recorded is sent to the file in time for it to be serialized, encoded and supplied to the write drivers of the magnetic transducer, the data must be requested a predetermined amount of time before it is actually recorded. Since this time period involves the propagation time of the control signal requesting the data and the propagation time of the data itself, plus the delays in the sending unit, a variation in anyone of these factors could result in an erroneous data transfer operation. As the time required for the disk file to serialize the character from the sending unit, encode the serial data stream and supply it to the magnetic transducer decreases as a result of improvements in high speed circuit technology, the propagation time becomes more significant and variations caused by different cable lengths become more critical to the design and installation of these units.

One solution to the problem caused by different cable lengths is to provide a suitable size buffer in the disk file so that characters can be transferred early enough to be stored in the buffer until needed. Another solution is to avoid the problem by not permitting units to be interconnected by cables whose lengths vary significantly. The present invention overcomes the above noted problems.

DISCLOSURE OF THE INVENTION

The present invention overcomes the problems discussed above by calculating the propagation time for the control signal in the particular installation on a regularly scheduled basis. The control signal to the sending unit is then issued at a time which reflects this calculation to insure that the first byte of data to be recorded is received at the file when it is needed regardless of the propagation time of the interface cables. The calculation is achieved in the preferred embodiment by measuring the number of bit and byte times that occur between the time the control pulse is sent to the sending unit and when the control pulse is received at the receiving unit. The control pulse, requesting the first byte of data to be recorded from the external device, is then issued the appropriate number of byte and bit times prior to when the first byte is to be recorded.

An added feature of the invention is the provision of a series of circuits that can be used to distinguish between the correct return pulse and a spurious noise pulse since the exact bit time for the return pulse to arrive is known.

BEST MODE FOR CARRYING OUT THE INVENTION

Figure 1:
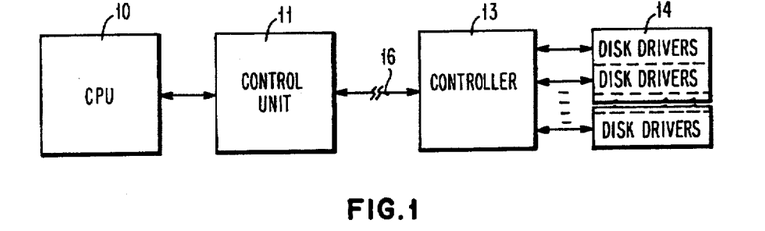
FIG. 1 is a block diagram illustrating a simple data processing system wherein the control unit-controller interface involves a variable length cable.

FIG. 1 shows a simple data processing system comprising a central processing unit 10, a control unit 11, a disk file controller 13 and a string of disk drives 14. As shown, the interface cable 16 interconnecting the control unit 11 and the controller 13 may vary in length in different installations. In the system shown in FIG. 1, data is stored on disk drives 14 in the form of predefined records, each of which is assigned a unique address. The address generally comprises a designation of a disk, a track on the disk, and a location on the track which may be referenced to some arbitrary starting point referred to as index.

Information is transferred between the disk file and the CPU under the control of the CPU program. The function of the control unit is to interpret commands issued by the CPU (or channel). These commands, referred to as channel command works (CCWs) in one well-known system, are interpreted by the control unit which, in turn, issues its own series of orders to the controller. The commands can generally be divided into two groups: those that involve an actual reading or writing operation by the disk files, and those that involve other control operations such as selecting the appropriate controller and disk drive, positioning the head to the correct track, and obtaining status information about a particular drive or controller.

Figure 1A:
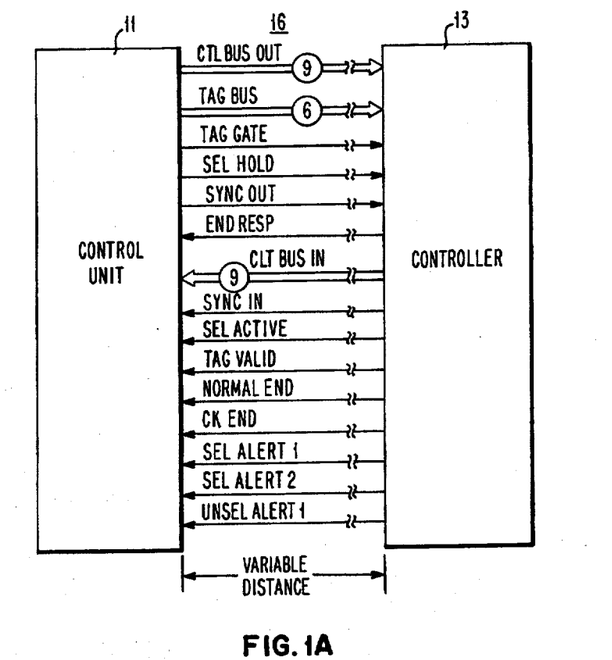
FIG. 1A illustrates in detail the control unit-controller interface shown in FIG. 1.

The transfer of this invention between the control unit and the controller occurs via the interface shown in FIG. 1A which comprises a number of different buses and lines for data and control signals.

As shown in FIG. 1A, the interface comprises the following lines from the control unit to the controller:

CTL Bus Out—The CTL bus out consists of 9 lines for one byte of data and parity. Bus out transmits command information and tag modifiers when Tag Gate is present and information to be recorded on a disk drive when "Sync Out" is present.

CTL Tag Bus—The CTL Tag Bus consists of 6 lines for five bits and a parity bit of control information.

CTL Select Hold—CTL Select Hold is a single line which is made active and remains active when a drive is selected. It remains active until an End Signal is received from a drive after the last operation on the drive is performed and the End Signal is acknowledged.

"Sync Out"—"Sync Out" is a single line which validates and gates data on Bus Out during a data transfer operation.

End Response—End Response is a single line used by the Control Unit to acknowledge to the controller the receipt of a Normal End or Check End signal from the controller.

The signal lines from the controller 13 to the storage control unit 11 are as follows:

CTL Bus In—The CTL Bus In consists of 9 lines for one byte of data and parity. Bus In transmits data from a disk to the Storage Control Unit during read operations with the use of "Sync In" for gating. Bus In is also used to transfer information to the Storage Control Unit when Normal End, Check In, or Tag Valid are active.

CTL "Sync In"—"Sync In" is a single line which is used during transfer of data to the Control Unit to validate and gate Bus In. "Sync In" is used to request a byte of data from the Control Unit.

Select Active—Select Active is a single line which becomes active after a successful selection sequence and remains active to indicate proper selection as long as Select Hold is active.

CTL Tag Valid—CTL Tag Valid is a single line which rises in response to Tag Gate from the Control Unit to indicate reception of the Tag Decode by the Controller.

Normal End—Normal End is a single line used to indicate to the Control Unit that the normal ending point of an operation has been reached.

Check End—Check End is a single line used to indicate that an abnormal ending condition exists. The abnormal condition is defined by the byte of data that exists on Bus In.

Alert Lines—Alert Lines is a series of three lines, two selected and one unselected. Select Alert 1 is used to indicate an error condition in the selected controller or drive. Select Alert 2 is used to indicate a busy condition. Unselected Alert 1 is used to indicate to the Control Unit that a polling sequence is required by the Control Unit.

Transfer of a byte of data between the Control Unit and the Controller is synchronized by the action of the "Sync In" and "Sync Out" lines. Assuming that a given drive has been selected, the actual transfer of data from the Control Unit, where the data is buffered, is initiated by the Controller issuing a "Sync In" signal to the Control Unit. On receiving the "Sync In" signal, the Control Unit placed a byte of data on the Data Out bus and simultaneously issues a "Sync Out" signal. The "Sync Out" signal is used by the Controller to gate the data on Bus Out into a register at the Controller. The "Sync In" pulse sent to the Control Unit is repeated until the last byte of data is transferred. Meanwhile, the first byte of data is transferred to the serializer unit where it is serialized and encoded and supplied to the write drivers of the magnetic transducers. Since the Controller is synchronized to the disk drive, the first byte of serialized data will be stored beginning at the location along the track which is under the magnetic transducer. If the length of cable 16 is allowed to vary between installations, the total time between the issuance of a "Sync In" signal and the return of a "Sync Out" signal, referred to as propagation time, will vary accordingly. In the system shown in FIG. 1, the length of the cable measured in terms of byte times, is allowed to vary between one-half byte time and three byte times. This is approximately from 5 meters to 136 meters, assuming a data transfer rate of 1.9 bytes per second. The variation in length may be greater and, in practice, is limited only by the line driver and not the control system.

Figure 2:
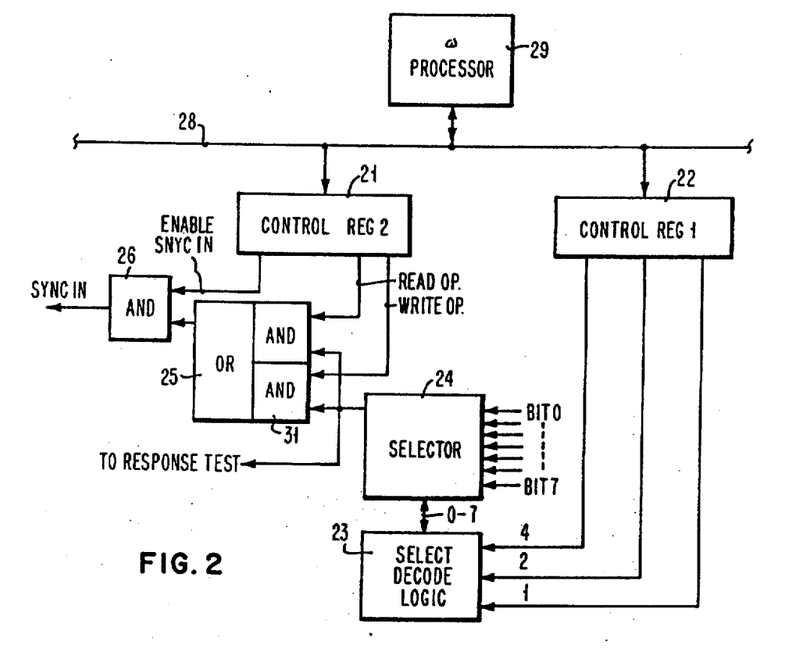
FIG. 2 is a diagram of the circuits (shown in block form) for generating the "Sync In" pulse applied to the "Sync In" interface line shown in FIG. 1A.
Figure 3:
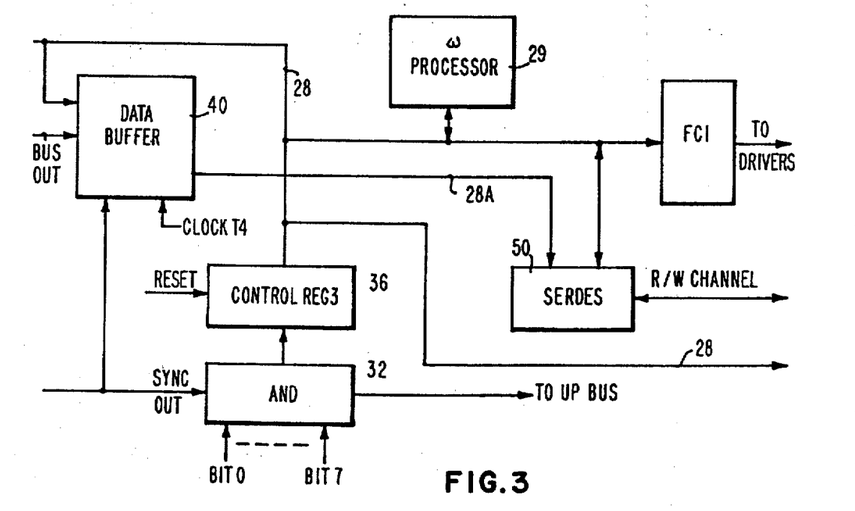
FIG. 3 is a diagram of circuits (shown in block form) for receiving the "Sync Out" pulse applied to the "Sync Out" line shown in FIG. 1A.

In the embodiment of the invention shown in FIGS. 2 and 3, this difference is accommodated for by first calculating the propagation delay in two steps and then issuing the "Sync In" pulse at a predetermined time selected in accordance with the results of the calculation so that the first byte of data to be recorded on the selected disk drive arrives at the Controller at the appropriate time.

FIG. 2 shows an arrangement for issuing a "Sync In" pulse selectively during any one of eight bit times, 0–7, which correspond to the bit times of the serial data being transferred to the file. The arrangement shown in FIG. 2 comprises a control register 21, a second control register 22, selection decode logic 23, selector 24, AND/OR logic unit 25, and AND GATE 26.

As shown in FIG. 2, control register 21 has its input connected to a data bus 28 which is adapted to be supplied with an 8 bit control byte from the microcontroller 29. The function of the microcontroller is to load control register 21 with an appropriate byte of control data at the correct time to generate the "Enable Sync In" signal for AND GATE 26 and the "read and write" op signals for AND/OR logic unit 25.

Control register 22 also has its input connected to bus 28 and receives an 8 bit byte of control data from the microcontroller 29. Three output lines designated 4, 2, 1 from control register 22 are connected to a decoder 23 whose function is to convert the input values of lines 4, 2 and 1 to one of eight output signals designated 0–7.

The eight line output of decoder 23 is supplied to selector 24 which is also supplied with bit ring signals 0–7 from a bit ring counter (not shown). The output of selector 24 is connected to one input of AND GATE 31. The other input to AND GATE 31 is from control register 21 and is designated "write op." The function of the control register 22, select decoder 23, selector 24 and AND GATE 31 is to provide a signal to AND GATE 26 during a write operation at any of the bit times 0–7 selected by the control register 22. The function of control register 21 is to provide an enable signal to AND GATE 26 which permits the "Sync In" signal to be issued at a predetermined bit time determined by control register 22.

While two separate control registers are shown in FIG. 2, it will be apparent to those skilled in the art that one control register could provide the desired control signals. Likewise, the input to the control register is shown as a microcontroller, but other devices known in the art for loading a control register with a predetermined byte of control information could be used.

FIG. 3 shows an arrangement for determining at what bit time the "Sync Out" pulse is received at the controller. As shown in FIG. 3, the arrangement comprises control register 36 and logic unit 32. The control register 36 is supplied with an output from logic unit 32 which comprises a series of AND GATES, each of which is supplied with the "Sync Out" signal and one of eight timing signals B0–B7. The output of control register 36 is connected to the microprocessor through bus 28. FIG. 3 also shows the data buffer 40 which is part of the controller 13 to which the bus out lines from the control unit are connected. As shown, the "Sync Out" pulse gates or clocks the data on bus out into the data buffer 40. During the next byte time, the byte of data in data buffer 40, if it is to be recorded on the disk drive, is transferred to the Serdes unit 50 through bus 28A where it is encoded and sent to the selected drive.

The operation of the arrangement shown in FIGS. 2 and 3 will now be described relative to the function of calculating the actual propagation delay of cable 16 for the particular installation. The first function to be performed is to issue a "Sync In" pulse at some preselected time. In this instance, the "Sync In" pulse is issued at T7 time by placing in control register 22 a signal pattern which causes the 4, 2 and 1 lines to be active. The select decoder converts the 4, 2, 1 signals to a select B7 signal supplied to selector 24. The output supplied to AND GATE 31, therefore, occurs at bit 7 time. The other input to the AND GATE 31 "write op" has previously been enabled by placing in control register 21 a signal pattern which makes "write op" and "Enable Sync In" active. As a result, the bit 7 signal is supplied to AND GATE 26 and the "Sync In" signal is issued at T7 time.

The arrangement of FIG. 3 first functions to determine the bit displacement relative to T7 independent of the byte displacement. The "Sync Out" pulse returned from the control unit is clocked into control register 36 by logic unit 32. The microprocessor examines the control register 36 during each subsequent byte time for a non-zero pattern until the "Sync Out" pulse is received. On detecting that the "Sync Out" signal has been received, the bit time displacement required to receive the "Sync Out" signal at T3 time is calculated by the microprocessor in accordance with Table 1 below.

Table 1

| If Issued At T7 and Received At | Displacement Is Bytes | Bits | To Receive At T3 Issue At |
|---|---|---|---|
| T7 | 1–2 | 0 | T3 |
| T0 | 1–2 | 1 | T2 |
| T1 | 1–2 | 2 | T1 |
| T2 | 1–2 | 3 | T0 |
| T3 | 0–1–2 | 4 | T7 |
| T4 | 0–1–2 | 5 | T6 |
| T5 | 0–1–2 | 6 | T5 |
| T6 | 0–1–2 | 7 | T4 |

Table 1 above relates the value clocked into the control register 36 representing the arrival time of the "Sync Out" pulse when the "Sync In" pulse is issued at T7. The table is constructed on the premise that the minimum cable length is sufficiently long so that the "Sync Out" pulse will not return within 4 bit times after the "Sync In" pulse is issued and the maximum cable length will insure a "Sync Out" pulse being returned within 3 complete byte times. The middle column shows the displacement in terms of possible byte times and actual bit times for each arrival time in column 1.

Since the first step in the process of determining actual propagation time is to determine the bit displacement, the actual number of bytes in the displacement is immaterial at this point. This bit displacement may be stored by the microprocessor for use after the next step.

The second step of the displacement measurement involves determining the number of byte times (independent of the number of bit times) consumed by the propagation delay. The microprocessor converts the arrival time of the "Sync Out" signal in column 1 to the bit time that a "Sync In" pulse should be issued to have an arrival time of T3. That information is then supplied to control register 22 so that the next "Sync In" pulse is issued at a time which should cause the "Sync Out" pulse to arrive at T3. During the propagation delay, the microprocessor will keep track of the number of byte times. The byte measurement and the bit measurement are then added together to determine the total propagation delay and can be used in subsequent operations.

With reference to FIG. 2, the second phase of the operation begins by loading control register 22 with a bit pattern to cause decoder 23 and selector 24 to provide a pulse to AND GATE 31 at the bit time which corresponds to the bit time in column 3 of Table 1 for the bit displacement determined during the first phase of the operation. Assuming, for example, that the "Sync Out" pulse was received at T4, the bit displacement from Table 1 is 5 bits and either 0, 1 or 2 bytes. The next "Sync In" pulse is issued at T6 time so that the "Sync Out" pulse should return at T3 time of one of the next three byte times.

Pattern 110 is therefore placed in control register 22. Control register 21 is supplied with a pattern which renders the "Enable Sync In" line to AND GATE 26 and the "write op" line to AND GATE 31 active.

A single "Sync In" signal is then sent at T6. The "Sync Out" pulse will be returned at T3 of the next byte time, the second byte time, or the third byte time so that the microprocessor examines the contents of control register 36 each of the next three succeeding byte times until a non-zero pattern is detected. If a non-zero pattern is detected at the first succeeding byte, the byte displacement under the previous assumption would be zero. If the non-zero pattern is detected during the second sequential byte time, the displacement is one byte and if the non-zero pattern is detected on the third successive byte time, the displacement is two bytes. The microprocessor now adds the byte displacement and bit displacement and stores this value for use in issuing the "Sync In" signal for the start of each subsequent write operation.

Figure 4:
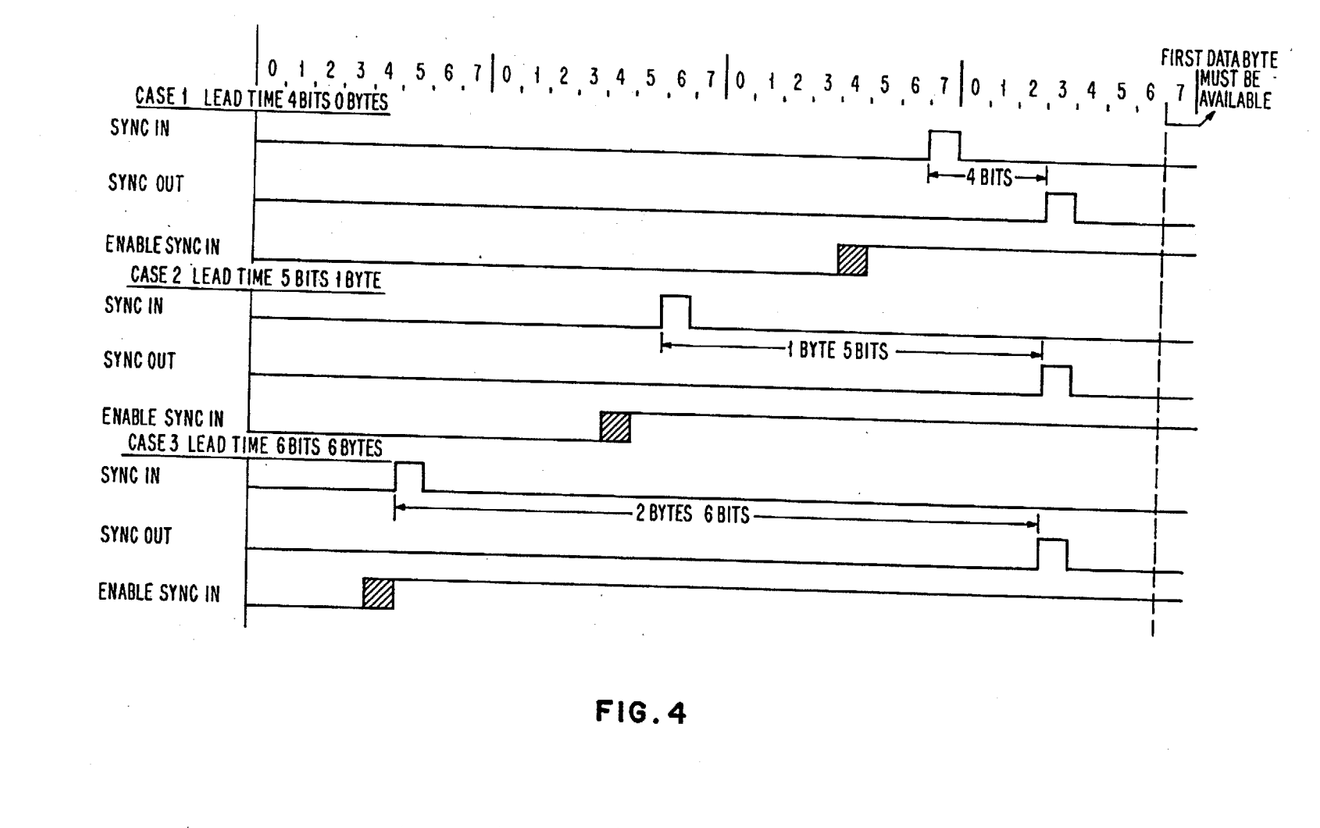
FIG. 4 is a timing diagram for the circuits shown in FIGS. 3 and 4 for three different cable lengths or propagation times.

FIG. 4 is a timing diagram illustrating the time a "Sync In" signal will be issued for three different displacements of 0 bytes 4 bits, 1 byte 5 bits, and 2 bytes 6 bits. As shown in FIG. 4, one bit time, namely bit time 4, is reserved for changing the status of the control registers. Any action which would occur during bit time 4 may therefore be advanced or delayed one bit time.

FIGS. 5A through 5E illustrate the system for generating a "Sync Out" timing error. Since the exact bit time that the "Sync Out" pulse should be received is known, the system is designed to check five possible errors. These errors are as follows:

1. Two "Sync Out" pulses occurring in a single byte time period.
2. Two consecutive "Sync In" pulses occurring with no intervening "Sync Out" pulse.
3. A "Sync Out" pulse present when not expected.
4. A "Sync Out" pulse occurring at "Sync In" time.
5. A "Sync Out" pulse present before the first "Sync In" pulse is generated.

Figure 5A:
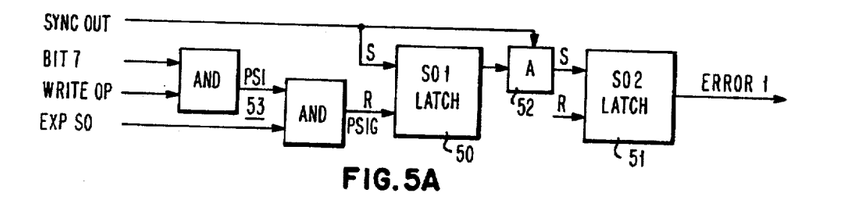
FIGS. 5A–5E illustrate a block diagram of the circuits for detecting a "Sync Out" timing error.

The manner in which the errors are detected will now be explained with reference to FIGS. 5A through 5E:

The circuit shown in FIG. 5A for detecting an error resulting from two "Sync Out" pulses in one byte time comprises SO1 Latch 50, SO2 Latch 51 and AND GATE 52 and the logic 53 for generating the "pseudo Sync In signal" and the "pseudo Sync In gated signal" applied to the reset terminal of Latch 50 and used in subsequent test circuits.

The output of SO1 Latch 50 is made active when it receives the first "Sync Out" pulse applied to the set terminal. Latch 51 is set by the leading edge of the "Sync Out" pulse provided the output of Latch 50 is active. Latch 50 is reset at bit 7 time during a write op and in the presence of an "Expect Sync Out" signal which generates a signal referred to as "pseudo Sync In gated" represented by PSIG in FIG. 5A. If a "Sync Out" pulse is active, goes inactive and returns to the active state again before T7 time, Latch 51 will be set and indicate an error condition referred to as Type Error 1 in FIG. 5A.

Figure 5B:
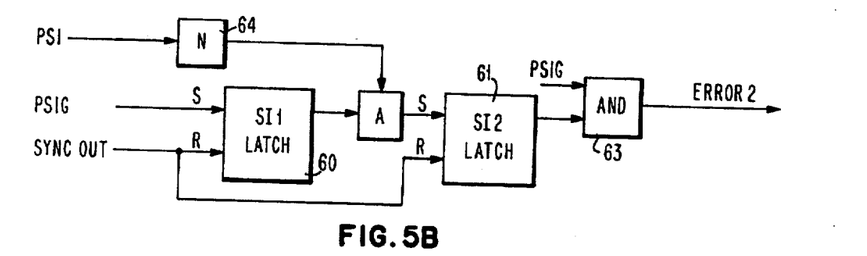

The circuit shown in FIG. 5B for detecting two consecutive "Sync In" pulses with no intervening "Sync Out" pulse comprises SI 1 Latch 60, SI 2 Latch 61, AND GATE 63, and the Invertor 64. The "pseudo Sync In" signal and the "pseudo Sync In gated" signal described in connection with FIG. 5A are employed as inputs to the Invertor 64 and the "Sync In" 1 Latch 60. The "Sync In" 1 Latch 60 is set by the "pseudo Sync In gated" signal at T7 time. The SI 2 Latch 61 is set by the leading edge of the "not pseudo Sync In" signal which is the output of the Invertor 64. No error condition is signalled since AND GATE 63 is not enabled by "Sync In" 2 Latch. However, if Latches 60 and 61 are not reset by the next bit 7 time, the "pseudo Sync In gated" signal supplied by the enable AND GATE 63 signifies an error condition.

Figure 5C:
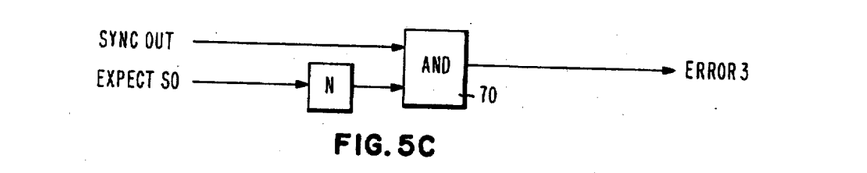

The circuits for detecting the receipt of the "Sync Out" pulse at the wrong byte time are shown in FIG. 5C. The "Expect Sync Out" signal is the byte time signal which was calculated by the system shown in FIGS. 2 and 3. This signal is inverted and applied to AND GATE 70 which also receives a "Sync Out" signal. AND GATE 70 is disabled except for the byte time when the "Sync Out" signal is expected. As a result, should a "Sync Out" signal occur, an error condition is indicated by an active output of AND GATE 70.

Figure 5D:
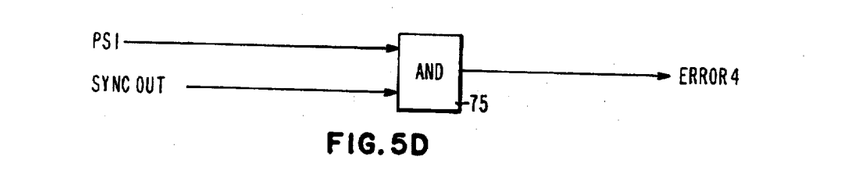

The AND GATE shown in FIG. 5D checks against the "Sync Out" pulse and a "pseudo Sync In" pulse occurring at T7 time. Should this occur, an error condition is indicated at the output of AND GATE 75. This prevents the data buffer from receiving a byte of data from Bus Out at the time it is being put into Serdes.

Figure 5E:
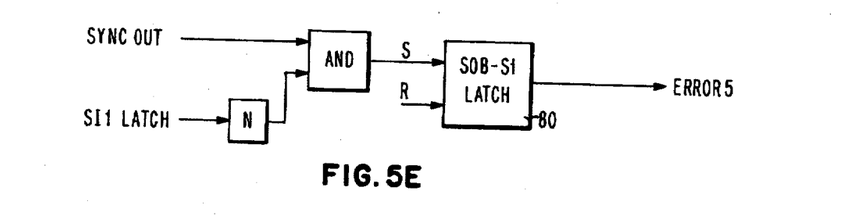

The circuits for detecting a "Sync Out" pulse occurring before the first "Sync In" pulse are shown in FIG. 5E. The circuits comprise Latch 80 which is set by a "Sync Out" pulse occurring before the signal from the "Sync In" 1 Latch goes active. This signal is generated from the "Sync In" 1 Latch 60 of FIG. 5B. Once the "Sync In" 1 Latch 60 goes active, the "Sync Out" pulse is degated and the Latch 80 cannot be set, and hence, no error condition can be indicated. However, if the "Sync Out" pulse is received while the "Sync In" 1 Latch is inactive, an error condition is indicated since Latch 80 would be set.

Figure 6:
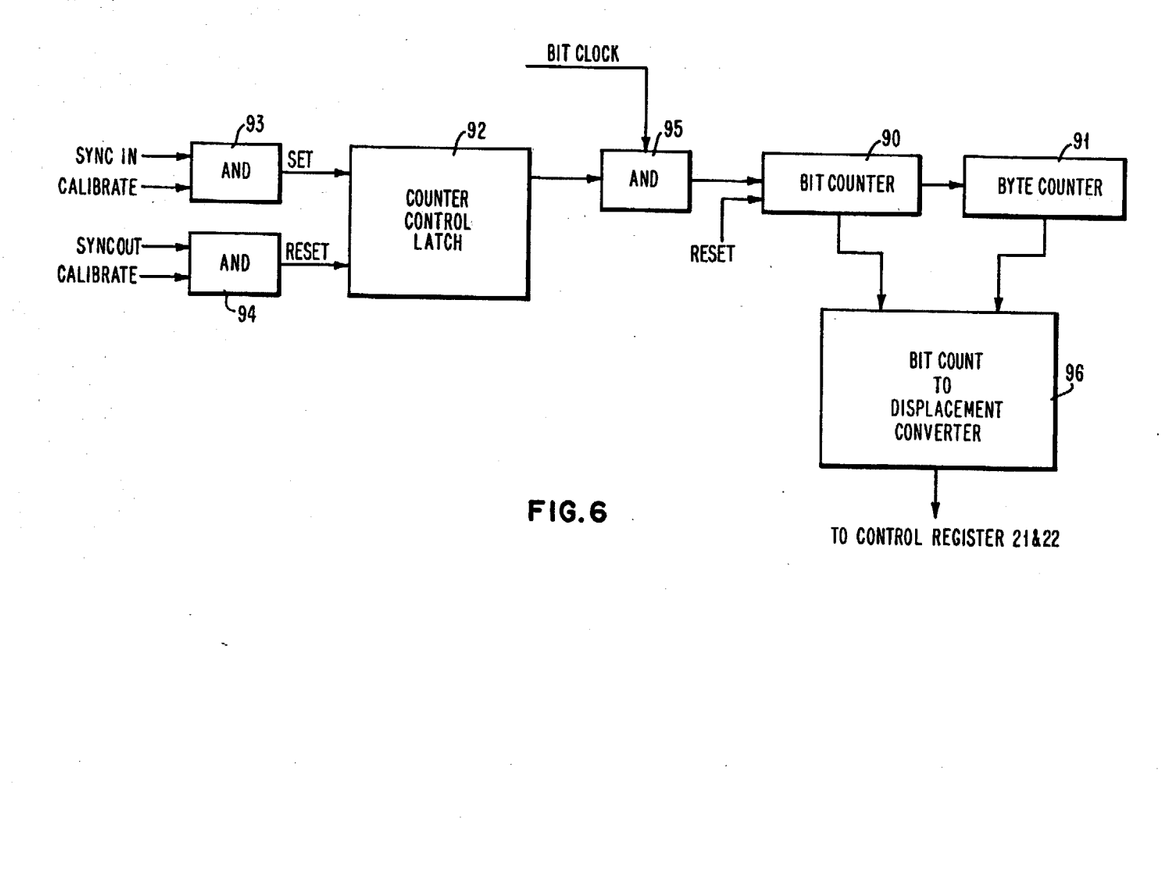
FIG. 6 shows another embodiment of the invention shown in FIGS. 2 and 3 in which prewired hardware circuits are employed in place of the microprocessor.

FIG. 6 shows another embodiment of the invention shown in FIGS. 2 and 3 using prewired logical circuits for determining the displacement and/or propagation delay instead of using the microprocessor shown in FIGS. 2 and 3. The system shown in FIG. 6 comprises a bit counter 90, a byte counter 91, a counter control latch 92, and AND GATES 93 and 94 connected to the set and reset input, respectively. of latch 92. The system further includes a convertor 96 whose function is to convert the actual propagation delay measured in bit and byte times by the counters to a suitable control signal for register 22 shown in FIG. 3.

The system of FIG. 6 operates as follows. Counter control latch 92 is set by application of the "Sync In" signal and a calibrate signal to AND GATE 93. The calibrate signal may originate from control register 22 or any other suitable source. The output of latch 92, when set, opens the input to AND GATE 95 and allows the bit clock signal to advance the bit counter 90. Bit counter 90 provides one input signal to byte counter 91 for each cycle of eight bits. The AND GATE 95 is disabled to stop the counter from advancing when the counter control latch 92 is reset by the signal from AND GATE 94. This signal is, in effect, the "Sync Out" signal received from the control unit.

Counters 90 and 91, therefore, measure the actual propagation delay of the interface cable, since counter 90 is started when the "Sync In" signal is issued and stopped when the "Sync Out" signal is received. The convertor 96 supplied with the measured propagation delay from counters 90 and 91 converts the count figure to a control byte to be supplied to control register 22 so that the "Sync In" signal requesting the first byte of data to be recorded will be issued early enough to insure that the byte of data is returned at a predetermined time relative to when it is actually to be recorded.

While the invention has been particularly shown and described with reference to a preferred embodiment thereof, it will be understood by those skilled in the art that various changes in the form and details may be made therein without departing from the spirit and scope of the invention.

Having thus described our invention, what we claim as new, and desire to secure by Letters Patent is:

1. In a disk file controller, a system for controlling the transfer of data to be recorded on a disk file wherein a byte of data to be recorded arrives at said controller at the same predetermined bit time relative to when it is actually recorded, regardless of the signal propagation time between the controller and the data source for different installations;

said control system including means for measuring the number of bit times that occur between the time said controller requests a first byte of data and the time said first byte of data is actually received;

and means connected to said measuring means to request another byte of data to be received at said predetermined bit time relative to when it is to be recorded, including means to issue said request said measured number of bit times prior to said predetermined bit time.

2. The system recited in claim 1 in which said measuring means comprises:
   (a) a clock signal generator,
   (b) a bit ring connected to said clock generator to provide a plurality of bit timing signals,
   (c) means connected to the output of said bit ring to issue a transfer request signal at a selected bit time corresponding to one of said bit timing signals,
   (d) means connected to said bit ring to determine the bit time that said requested byte of data arrives at said controller,
   (e) and means to convert said bit arrival time to said number of bit times representing the actual propagation delay between the controller and the data source for the particular installation.

3. A method for controlling the transfer of data to a disk file from a control unit through an interface cable which includes a "Sync In" line to the control unit for requesting one byte of data and a "Sync Out" line from the control unit for clocking said one byte of data into the controller, said method comprising the steps of:
   measuring in bit time units the propagation delay of said cable prior to the transfer of a data byte to be recorded on said file; and
   issuing a "Sync In" signal at one of a plurality of bit times predetermined in accordance with the said bit time unit measurement obtained in the preceding step, to cause a byte of data which is to be recorded on the file to be received at the controller at a predetermined bit time independent of said propagation delay.

4. The method recited in claim 3 in which said propagation delay is measured by the following steps:
   (a) generating a plurality of timing signals representing sequential bit times of data to be recorded on said disk file,
   (b) selecting one of said timing signals to cause a "Sync In" signal to be issued at the corresponding bit time,
   (c) sensing the bit time the next "Sync Out" signal is received by combining said "Sync Out" signal with each of said bit timing signals,
   (d) and converting the arrival time of said "Sync Out" signal to the propagation delay of said cable.

5. In a system for controlling the transfer of bytes of data between first and second units interconnected by an interface cable having a signal propagation delay which can vary between predetermined minimum and maximum values for different installations, said first unit including the improvement of:
   (1) means connected to said cable to measure in bit time units the actual propagation time of a control signal sent to said second unit and a corresponding signal returned to said first unit;
   (2) and means coupled to said measuring means to issue to said second unit a data transfer control signal at one of a plurality of bit times preselected in accordance with the bit time unit measurement of said actual propagation time, to insure arrival of the first byte of data at said first unit at a second bit time which is predetermined independently of said actual propagation delay.

6. In a system for controlling the transfer of bytes of data between first and second units interconnected by an interface having a signal propagation delay which can vary between predetermined minimum and maximum values for different installations, wherein a byte of data is transferred from said second unit to said first unit with a "Sync Out" pulse in response to receipt by said second unit of a "Sync In" pulse issued by said first unit, said first unit including in combination:
   a clock signal generator for providing a plurality of bit signals defining different bit times;
   means for issuing from said first unit a "Sync In" signal at a first predetermined bit time;
   means for determining the bit time that said "Sync Out" signal arrives at said first unit; and
   means for issuing a second "Sync In" pulse at one of said different bit times selected in accordance with the bit time arrival of said first "Sync Out" signal to cause a second "Sync Out" signal to be received at said first unit at a second predetermined bit time.

7. The combination recited in claim 6 in which said means for issuing said "Sync In" signal at said first predetermined bit time includes a control register, a logical unit connected to said control register and said clock generator, and means for entering into said control register control data which selects which of said bit signals will enable the issuance of said "Sync In" signal.

8. The combination recited in claim 7 in which said means for issuing said second "Sync In" pulse includes means for issuing said "Sync In" signal at said first predetermined time, and another means for loading said control register with other control data derived from the determined arrival bit time of said "Sync Out" signal.

9. The combination recited in claim 8 in which said another means is a microprocessor having an output connected to supply control data to said control registers.

10. The combination set forth in claim 6 further including circuitry for generating an error signal whenever said second "Sync Out" signal is not received at said predetermined time.

11. The combination set forth in claim 10 in which said error generating circuitry includes means for indicating the occurrence of two "Sync In" signals without an intervening "Sync Out" signal.

12. The combination set forth in claim 11 in which said error generating circuitry includes means to indicate the receipt of a "Sync Out" signal at said controller without a "Sync In" signal having been issued by said controller.

* * * * *